United States Patent
Sommer et al.

(10) Patent No.: US 6,540,826 B2
(45) Date of Patent: Apr. 1, 2003

(54) SULFATE-FREE AND ALKALI-FREE SETTING AND HARDENING ACCELERATOR

(75) Inventors: Marcel Sommer, Winterthur (CH); Franz Wombacher, Oberlunkhofen (CH); Theodor A. Burge, Geroldswil (CH)

(73) Assignee: Sika Schweitz AG, Zurich (CH)

( * ) Notice: Subject to any disclaimer, the term of this patent is extended or adjusted under 35 U.S.C. 154(b) by 0 days.

(21) Appl. No.: 09/881,685

(22) Filed: Jun. 18, 2001

(65) Prior Publication Data

US 2002/0023574 A1 Feb. 28, 2002

(30) Foreign Application Priority Data

Jun. 21, 2000 (EP) .............................................. 00113019

(51) Int. Cl.$^7$ ................................................ C04B 22/06
(52) U.S. Cl. ........................ 106/724; 106/819; 106/823
(58) Field of Search ................................ 106/724, 727, 106/819, 823

(56) References Cited

U.S. PATENT DOCUMENTS 5,296,623 A * 3/1994 Katsoulis et al. ............. 556/27
5,772,753 A * 6/1998 Valenti ....................... 106/810

FOREIGN PATENT DOCUMENTS

| DE | 248379 | * | 8/1987 |
| EP | 0742179 | | 11/1996 |
| JP | 02240032 | * | 9/1990 |
| JP | 06264292 | * | 9/1994 |
| SU | 1820885 | * | 6/1993 |

* cited by examiner

*Primary Examiner*—Paul Marcantoni
(74) *Attorney, Agent, or Firm*—Burns, Doane, Swecker & Mathis, L.L.P.

(57) ABSTRACT

Described are setting and hardening accelerators for hydraulic binders and said binder comprising compositions that are free of sulfates, alkali metals and chlorides. The setting and hardening accelerators comprise, as main component, water-soluble fluoride comprising aluminum salts and optionally complexing agents and/or amines.

In comparison with alkaline accelerators, said accelerators result in an essential shortening of the setting time and a fast development of compressive strengths. In comparison with commercially available alkali-free accelerators based on aluminum sulfate and organic acids, by the accelerator of the present invention the later formation of ettringite is prevented.

17 Claims, No Drawings

SULFATE-FREE AND ALKALI-FREE SETTING AND HARDENING ACCELERATOR

CROSS REFERENCE TO RELATED APPLICATIONS

This application claims the priority of European patent application no. 00 113 019.4, filed Jun. 21, 2000, the disclosure of which is incorporated herein by reference in its entirety.

BACKGROUND OF THE INVENTION

The present invention relates to a sulfate-free and alkali-free or alkaline metal-free, respectively, and chloride-free accelerator as well as a method for setting and hardening of a hydraulic binder.

Examples for binders the setting and hardening of which occurs faster due to the addition of an accelerator of the present invention are for example cement or hydraulic lime, and examples for mixtures comprising such binders are mortar and concrete.

Applications for the inventive accelerator and the inventing method are the production of pre-fabricated elements and the acceleration of concrete produced at the construction site. In the first case, the usual acceleration of the hardening by heating (by means of electro ovens or oil ovens or steam) can be shortened or even entirely eliminated. In the second case, the time needed until the mold encasing the concrete can be removed, can be shortened, or the application of concrete can be continued also at lower temperatures. Further applications are in the production of fast setting cement and mortar mixtures, in particular for fixing pre-fabricated parts, casted parts etc.

A specific field of application is spraying mortar and spraying concrete. Such mortars and concretes serve the production of building constructions in underground and surface engineering as well as for the extension and lining of underground, natural or artificially constructed cavities, such as adits, tunnels or mines, for which the concrete must meet the static requirements as well as being water-tight. They also serve the consolidation of excavations, embankments, loose rock faces etc.

Already many substances are known that accelerate the setting and hardening of concrete. The most often used are i.a. strongly alkaline reacting substances such as alkali hydroxides, alkali carbonates, alkali silicates, alkali aluminates and alkaline earth chlorides.

Substances with strongly alkaline properties are undesired due to the health risks they can cause when persons are handling such substances. Burning of the skin of the worker, harmful effects on the respiratory system, especially the lungs, and irritation of the eyes and etching of the cornea can occur.

In view of concrete technology, strongly alkaline setting accelerators reduce the final strength, they cause larger shrinkage, what may result in crack formation and therefore strongly reduces the long time quality, in particular the resistance to sulfate of the concrete.

An important factor that affects the long time stability of concrete constructions is the later formation of Ettringit (furtheron referred to as Delayed Ettringit Formation (DEF)). By the formation of ettringit in the cured cement system, the structure of the building or construction, respectively, expands such that cracks or flakings occur.

In literature many documents concerning the DEF can be found that unambiguously show that an additional sulfate source significantly furthers the later formation of ettringit.

The commercially available accelerators comprise 15–25% sulfate and therefore are a not neglectable source for sulfate.

Further, in several standards, limitations for the sulfate content of concrete systems is prescribed (e.g. the Austrian standard [guideline Shotcrete] requires a maximal total sulfate content of 4.5% by mass $SO_3$ [sum of accelerator and cements]).

The setting accelerator according to the present invention does not comprise any sulfate, thus hinders a supplementation of the concrete with sulfates and such does not add to the DEF.

Accelerators for the setting of hydraulic binders on the basis of amorphous aluminum hydroxide are already known from EP-A 0 026 262, in particular claims 1 and 11 to 13, as well as from chemical abstracts volume 86, number 18, May 1977, page 300, 126087c.

According to EP-A 0 026 262, page 2, last paragraph, the particle size of the amorphous aluminum hydroxide is in particular in the range of 4.8 and 5.4 $\mu$m.

Also a swellable cellulose product and further additives can be comprised in such a hardening accelerator, see EP-A-0 026 262, in particular claims 8 to 10 and the examples.

From DE-A 2 548 687, in particular patent claim and page 15, the addition of aluminum sulfate and nitrates to setting accelerators on the basis of aluminates and aluminum oxide are known.

From FR-A 2 471 955, in particular claims 1 to 6, the use of formats and nitrates in accelerators are known.

EP 0 076 927 describes a method for the acceleration of the setting by addition of amorphous aluminum hydroxide and at least one water-soluble sulfate and/or nitrate and/or formiate.

EP 181 739 A1 describes the use of calcium sulfoaluminate and a mixture of calcium aluminates that together with alkali metals or alkaline earth metals and addition of 250% water result in a curable slurry.

JP 63 206 341 A2 discloses an accelerator comprising calcined alunite, calcium sulfoaluminate, sodium aluminate and sodium carbonate.

JP 58 190 849 A2 describes a mixture of calcium sulfoaluminate, calcium sulfate hemihydrate and calcium hydroxide for the preparation of fast setting, sprayable coatings.

SU 697 427 mentions a fast setting cement obtained by addition of calcium aluminate, calcium sulfoaluminate, calcium oxide, ferrite, silicate and gypsum.

JP 54 026 817 mentions the accelerated curing of gypsum by addition of calcium sulfoaluminate.

JP 53 099 228 describes an accelerator for grouting mortar based on calcium sulfoaluminate and calcium fluoroaluminate and water reducing agents.

In DE-OS 2 163 604 accelerators on the basis of calcium fluoroaluminate are mentioned.

From JP 01 290 543 A2 mixtures of calcium sulfoaluminate with calcium sulfate and lithium carbonate are known as accelerators for low temperature applications.

SU 1 350 136 A1 describes clinker with fast setting achieved by addition of barium sulfate, calcium aluminate and calcium sulfoaluminate.

WO 97/36839 describes the use of lithium silicate and/or lithium aluminate and/or aluminum salts.

WO 98/18740 comprises a method for the production of a setting and hardening accelerator for hydraulic binders. The product that according to claim 1 necessarily comprises of 5 components shows strong turbidity, high viscosity and a low storage stability. This can lead to plug up of the spray nozzles. At the construction site, upon dosing of the product, in particular at low temperatures, the high viscosity causes problems. A dilution of the product is not possible since thereby part of the basic salts are precipitated. The low pH-value leads to corrosion at dosing and spraying apparatuses.

U.S. Pat. No. 5,772,753 describes an accelerator on the basis of aluminum hydroxide with an organic anion. The production from an alkali aluminate solution comprises a very sumptuary washing procedure and mostly leads to insoluble aluminum compounds.

BRIEF DESCRIPTION OF THE INVENTION

Hence, it is a general object of the invention to provide a sulfate-free and alkali-free or alkali metal-free, respectively, and chloride-free setting and hardening accelerator by which a very fast setting can be achieved.

Now, in order to implement these and still further objects of the invention, which will become more readily apparent as the description proceeds, the accelerator for the setting and hardening of a binder or a mixture comprising a binder is manifested by the features that said accelerator comprises at least one water-soluble fluoride comprising aluminum salt, and optionally a complexing agent (the term complexing agent as it is used in the scope of the present invention means substances that improve the setting procedure and the stabilization) and/or amines, whereby said amines act as stabilizers in order to prevent a precipitation of aluminum hydroxide. Preferably the pH-value of an accelerator of the present invention is in the range of about pH 2–8.

Further objects of the present invention are the use of an accelerator of the present invention for the acceleration of the setting and hardening of hydraulic binders, hydraulic binders admixed with latent hydraulic or inert fillers, mortar or concrete; a method for the accelerated setting and hardening of a mixture comprising a binder that is characterized in that usually 0.1 to 10 weight percent (this amount refers to an accelerator with 20–80 weight percent water content), referred to the weight of the binder, of an inventive sulfate-free, alkali-free or alkaline metal-free, respectively, and chloride-free setting and hardening accelerator are added to said mixture; as well as a hydraulic setting or hardened binder or binder comprising mixture containing an accelerator of the present invention.

A further object of the present invention is the production of a binder of the invention under generation of the water-soluble fluoride comprising aluminum salts from aluminum hydroxide and/or aluminum oxide and fluoric acid, optionally at enhanced temperatures, preferably prior to the admixture optionally further additives.

Furthermore, another object of the invention is a cured or uncured binder comprising mixture that also comprises an accelerator of the present invention.

DETAILED DESCRIPTION OF THE INVENTION

The term alkali-free or alkaline metal-free, respectively, as it is used in the scope of the present invention corresponds to usual standards and means $\leq 1\%$ $Na_2O$-equivalents. For reasons of improved readability, furtheron only the term alkali-free will be used for designating the sulfate-free and alkali-free and alkaline metal-free accelerator according to the above definition.

The sulfate-free and alkali-free and chloride-free setting and hardening accelerator for hydraulic binders of the present invention comprises at least one water-soluble fluoride-comprising aluminum salt. It is especially suitable for inorganic hydraulic binders or hydraulic binder comprising mixtures. Examples for binders, the setting and hardening of which can be accelerated by the accelerator of the present invention are cement, hydraulic lime alone or in admixture with latent hydraulic binders and inert fillers, and examples for mixtures comprising such binders are e.g. mortar and concrete.

Preferred water-soluble fluoride comprising aluminum salts are in particular those that are producible from aluminum hydroxide and/or aluminum oxide and hydrofluoric acid. It has surprisingly been found that each aluminum hydroxide is usable for the generation of suitable fluorides, i.e. not only amorphous but also crystalline aluminum hydroxide. Dependent on the concentration and amount of hydrofluoric acid the exact composition of the fluoride comprising aluminum salts can slightly vary. The aluminum salts produced from e.g. aluminum hydroxide and/or aluminum oxide and hydrofluoric acid can either directly be used in the inventive accelerator or after drying, for example by means of spray drying, if an accelerator in powder form is desired.

The inventive accelerators can furthermore comprise at least one sulfate-free aluminum salt, and/or at least one complexing agent, and/or at least one amine, and/or at least one thickening agent. Preferably the at least one aluminum salt is selected from the group comprising oxalate, nitrate, glycolate, lactate, acetate, formiate or the respective basic salts or mixtures of the mentioned salts. The at least one complexing agent, preferably is a complexing agent selected from the group consisting of nitriloacetic acid, ethylene diamine tetraacetic acid, hydroxycarboxylic acids, polyhydroxycarbonic acids, phosphonic acids, salts of said acids, polyols or mixtures thereof, usually in an amount of 0.01–5 weight-% referred to the weight of a liquid accelerator with a water content of 20–80 weight-%. The at least one amine preferably is an amine selected from the group consisting of alcane amines and/or alcanol amines, whereby the alcane or alcanol preferably is selected from the $C_1$–$C_6$ alcanes or alcanols respectively, in an amount of 0.1–20 weight-% referred to the weight of a liquid accelerator with water content of 20–80 weight-%. The at least one thickening agent preferably is a thickening agent selected from the group consisting of bentonite, bentones, fermented organic biopolymers, alginates, polyglycol ethers, acrylate thickeners or urethane thickeners and mixtures thereof.

The inventive accelerators can be present as solutions, dispersions, or in powder form, whereby an inventive accelerator in powder form is preferably dissolved or dispersed in water prior to its use.

An inventive accelerator, preferably an accelerator in dissolved or dispersed form, is especially suitable for a method also being an object of the present invention. Said method for the acceleration of the setting and hardening of hydraulic binders as well as thereof produced mortars and concretes is characterized in that the inventive accelerator is added to the hydraulic binder in an amount of preferably 0.1 to 10 weight-% (water content of accelerator 0–80 weight-% water), referred to the weight of the hydraulic binder.

The inventive accelerator can be used for accelerating the setting and hardening of hydraulic binders, hydraulic binders in combination with latent hydraulic binders or inert fillers, mortar and concrete. A preferred use of the inventive setting and hardening accelerator is in spraying mortar or spraying concrete according to the dry spraying method or the wet spraying method. Said method is characterized in that the accelerator is added or addosed, respectively, to the dry binder, mortar or concrete, or to the binder, mortar or concrete mixed with water, in the conveyor pipe, the prewetting nozzle or the spraying nozzle in liquid or dispersed form with a liquid dosing apparatus directly into the mixture or into the mixing water. An accelerator in powder form is preferably addosed with a powder dosing apparatus directly at the above-mentioned places.

According to the present invention, the accelerator is preferably produced in that the water soluble, fluoride comprising aluminum salt is produced from aluminum hydroxide and hydrofluoric acid, optionally at enhanced temperature, prior to the admixture of further components that possibly may be comprised in the accelerator. The aluminum hydroxide can be used in amorphous as well as crystalline form. As an alternative, also aluminum oxide can be used as starting material.

A further object of the present invention is also a hardenable or hardened, respectively, binder comprising mixture comprising the inventive accelerator.

By using an inventive setting and hardening accelerator, a very fast setting of the respective binder or mixture comprising such binder, is effected, and high initial and final strengths are achieved. The setting and hardening accelerator neither to the applying person nor to the environment are caustic or toxic.

At the same time, the costs at the construction site can be reduced due to a significantly enhanced effectivity and reduced maintenance of the apparatus as well as reduced down time compared with today's alkali-free accelerators. Besides of the resulting technical also enormous economic advantages result.

Since the setting accelerators of the invention do not comprise any alkalis, neither the strength development nor the shrinkage are "negatively" affected.

The following examples further illustrate the invention. They, however, shall not limit it in any way.

EXAMPLES

Accelerator consisting of:

| No. | components | mass-% |
|---|---|---|
| 1 | water | 55 |
| | aluminum hydroxide | 12 |
| | hydrofluoric acid 40% | 25 |
| | complexing agent * | 0.5 |
| | amine ** | 7.5 |

| No. | components | mass-% |
|---|---|---|
| 2 | water | 25 |
| | aluminum hydroxide | 10 |
| | aluminum nitrate . 9H$_2$O | 40 |
| | hydrofluoric acid 40% | 20 |
| | complexing agent * | 0.5 |
| | amine *** | 4.5 |
| 3 | water | 61.5 |
| | aluminum hydroxide | 13 |
| | hydrofluoric acid 40% | 25 |
| | complexing agent * | 0.5 |

* = ethylene diamine tetraacetic acid
** = diethanol amine
*** = methyldiethanol amine were compared with usual commercially available accelerators in the following examples.

In the following examples, the influence of the inventive setting accelerators to cementitious systems is shown. As test mixture mortars where used that simulate concrete. The mixtures are composed as follows:

| | |
|---|---|
| Portland cement type CEM I 42.5 | 250.00 g |
| sand 0–2.2 mm | 750.00 g |
| water | 122.50 g |
| super plasticiser on melamine basis | 2.50 g |

The setting samples were examined with a penetrometer of the firm RMU (Italy). Initial set and final set were determined at a penetration resistance of the 2 mm needle at 600 g or 2200 g, respectively.

The effect of an inventive setting accelerator on the setting time in comparison to a usual sulfate comprising, alkali-free and chloride-free accelerator is showed in the following table.

| | penetration resistance | |
|---|---|---|
| Accelerator | initial set | final set |
| accelerator according to invention No. 1 | 6 min. | 20 min. |
| accelerator according to invention No. 2 | 17 min. | 43 min. |
| accelerator according to invention No. 3 | 12 min. | 38 min. |
| usual commercial accelerator | 30 min. | 65 min. | accelerator=6% by weight of cement
usual commercial accelerator=aqueous solution on the basis of aluminum sulfateformiate The significant improvement or lower viscosity, respectively, of the accelerator of the present invention is shown in comparison to usual setting accelerators. The viscosity was measured by means of the flow out time from a DIN ford beaker φ 4 mm.

| accelerator | flow out time (20° C.) |
|---|---|
| accelerator according to invention No. 1 | 18 sec. |
| accelerator according to invention No. 2 | 20 sec. |
| accelerator according to invention No. 3 | 15 sec. |
| usual commercial accelerator | 28 sec. |

In comparison to usual accelerators the values of the flow out time of the inventive accelerators are much lower.

While there are shown and described presently preferred embodiments of the invention, it is to be distinctly understood that the invention is not limited thereto but may be otherwise variously embodied and practiced within the scope of the following claims.

What is claimed is:

1. A sulfate-free and alkali-free and chloride-free setting and hardening accelerator for hydraulic binders comprising at least one water soluble fluoride comprising aluminum salt.

2. The accelerator of claim 1 wherein the water-soluble fluoride comprising aluminum salt is obtained by reaction of an aluminum compound selected from the group consisting of amorphous aluminum hydroxide, crystalline aluminum hydroxide, aluminum oxide and mixtures thereof with hydrofluoric acid.

3. The accelerator of claim 1 that additionally comprises an aluminum salt selected from the group consisting of oxalates, nitrates, glycolates, lactates, acetates, formiates, their respective basic salts, and mixtures of these salts.

4. The accelerator of claim 1 that additionally comprises at least one complexing agent.

5. The accelerator of claim 1 that additionally comprises at least one amine.

6. The accelerator of claim 1 that additionally comprises at least one thickening agent.

7. The accelerator of claim 1 that is a solution or a dispersion.

8. The accelerator of claim 1 that is a powder.

9. A method for the production of an accelerator of claim 1, wherein the water-soluble fluoride comprising aluminum salt is produced from an aluminum compound selected from the group consisting of amorphous aluminum hydroxide, crystalline aluminum hydroxide, aluminum oxide and mixtures thereof with hydrofluoric acid, optionally at enhanced temperature, prior to the blending with other components and then optionally dried.

10. A method for the acceleration of the setting and hardening of hydraulic binders, hydraulic binders admixed with latent hydraulic binders or inert fillers or a combination thereof, as well as thereof produced mortar and concrete, wherein an accelerator in powder form of claim 8 is dissolved or dispersed in water prior to its addition to said hydraulic binder, or thereof produced mortar or concrete.

11. A method for the acceleration of the setting and hardening of hydraulic binders, hydraulic binders admixed with latent hydraulic binders or inert fillers or a combination thereof, as well as thereof produced mortar and concrete, wherein an accelerator in form of a solution or dispersion of claim 7 is added to said hydraulic binder, or thereof produced mortar or concrete in an amount of from 0.1–10 wt.-% referred to the weight of the hydraulic binder.

12. A method for the acceleration of the setting and hardening of spray mortar or spray concrete according to the dry spraying or the wet spraying method, wherein an accelerator of claim 7 is added to the dry binder, mortar or concrete, or to the binder, mortar or concrete admixed with water with a liquid dosing apparatus directly into the mixture or into the mixing water in the conveyor pipe, the pre-wetting nozzle, or the spray nozzle.

13. A method for the acceleration of the setting and hardening of spray mortar or spray concrete according to the dry spraying or the wet spraying method, wherein an accelerator of claim 8 is added to the dry binder, mortar or concrete, or to the binder, mortar or concrete admixed with water with a powder dosing apparatus directly into the mixture or into the mixing water in the conveyor pipe, the pre-wetting nozzle, or the spray nozzle.

14. A mixture comprising a hydraulic binder and an accelerator of claim 1.

15. The accelerator of claim 4, wherein said at least one complexing agent is selected from the group consisting of nitrilotriacetic acid, ethylene diamine tetraacetic acid, hydroxycarboxylic acids and polyhydroxycarboxylic acids, phosphonic acids, polyols, and mixtures thereof in an amount of 0.01–5 wt.-% referred to the weight of a liquid accelerator with a water content of 20–80 wt.-%.

16. The accelerator of claim 5, wherein said at least one amine is selected from the group consisting of alkylamine, alkanolamine and mixtures thereof, in an amount of 0.1–20 wt.-% referred to the weight of a liquid accelerator with a water content of 20–80 wt.-%.

17. The accelerator of claim 6, wherein said at least one thickening agent is selected from the group consisting of bentonites, bentones, fermented organic biopolymers, alginates, polyglycol ethers, acrylate thickeners, urethane thickeners, and mixtures thereof.

* * * * *

UNITED STATES PATENT AND TRADEMARK OFFICE
CERTIFICATE OF CORRECTION

PATENT NO.      : 6,540,826 B2
DATED           : April 1, 2003
INVENTOR(S)     : Marcel Sommer et al.

It is certified that error appears in the above-identified patent and that said Letters Patent is hereby corrected as shown below:

<u>Title page,</u>
Item [73], Assignee, should be changed from "Sika Schweltz AG" to
-- Sika Schweitz AG --.

Signed and Sealed this

Eleventh Day of November, 2003

JAMES E. ROGAN
*Director of the United States Patent and Trademark Office*